May 28, 1963 L. I. COHEN 3,091,494
REAR WINDOW PANEL FOR CONVERTIBLE AUTOMOBILE TOPS
Filed Aug. 26, 1960 2 Sheets-Sheet 1

*INVENTOR.*
LOUIS I. COHEN
BY
ATTORNEYS

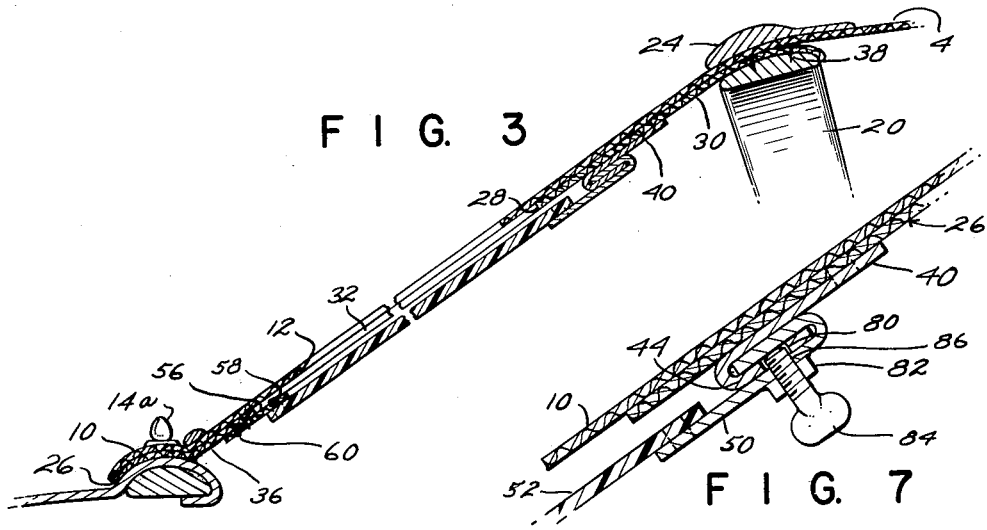
FIG. 3
FIG. 7
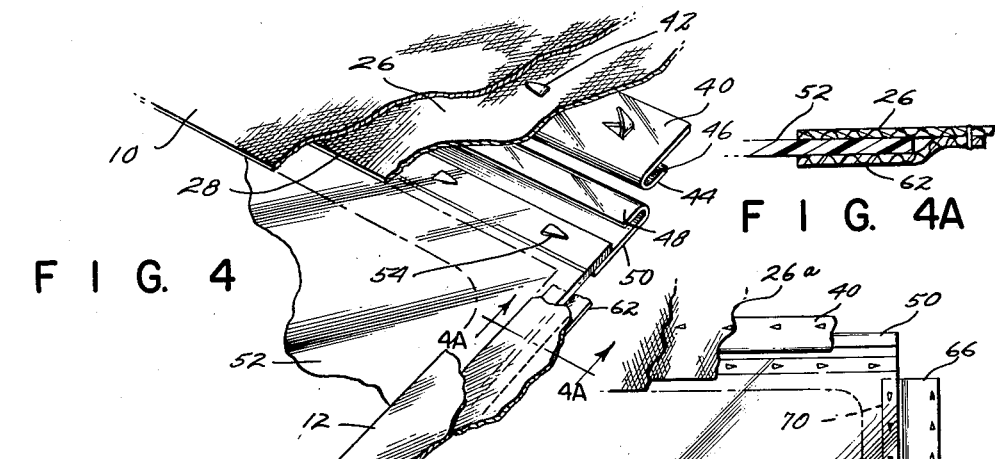
FIG. 4
FIG. 4A
FIG. 5
FIG. 6
INVENTOR.
LOUIS I. COHEN
BY
ATTORNEYS United States Patent Office 3,091,494
Patented May 28, 1963

3,091,494
REAR WINDOW PANEL FOR CONVERTIBLE AUTOMOBILE TOPS
Louis I. Cohen, New Bedford, Mass., assignor to Hattie I. Cohen, New Bedford, Mass.
Filed Aug. 26, 1960, Ser. No. 52,223
6 Claims. (Cl. 296—137)

This invention relates to tops for convertible automobiles and more particularly to a collapsible automobile top having a new rear window panel construction.

In accordance with current practices, the rear window panel of a conventional collapsible automobile top is provided with a window opening and a rectangular closure flap having a zipper fastener for releasably securing three edges of the closure flap to the panel so as to close off the window opening. Generally also the closure flap is provided with a transparent pane which forms a small window permitting rear view observations by the driver even when the closure flap is in closed position. While this form of construction is a great improvement over preceding forms, it is nevertheless limited by certain disadvantages. For one thing, the zippers which are employed must be of a heavy duty construction; otherwise they will have a relatively short life. Because of their heavy duty construction, these zippers are relatively expensive to buy, install, and repair. Another disadvantage of the zipper-type construction is that it is difficult to close or open the zipper. In many cases it is essential to crack the top in order to close the zipper. To "crack" the top means to release its tension slightly. Notwithstanding this maneuver, there still remains the problem of overcoming shrinkage of the top. The more the top shrinks, the more difficult it is to open or close the zipper. A further disadvantage of this type of construction is that it is not feasible to have the zipper extend continuously around all four sides of the window closure so as to make the closure fully removable. As a result, the closure is really a flap, and when the zipper is fully opened, the flap generally hangs down into the well provided for the top when it is retracted. In this hanging position, the flap receives an abnormal amount of punishment, thereby reducing its life, particularly the life of the transparent pane of glass or plastic which generally is secured to and forms part of the closure.

Accordingly, the primary object of the present invention is to provide a new form of rear window construction which eliminates the disadvantages attendant to zipper-type constructions.

A more specific object of the present invention is to provide a rear window panel construction for convertible tops which comprises a closure panel which lies inside of the rear section of the foldable top and which is adapted to be secured in closing relation to the window opening formed in the rear section of the foldable top. The closure panel is provided with a metal strip along one edge which is formed to be coupled to a mating strip of metal which is secured to the rear window panel of the foldable top. The closure panel and/or one or both of the metal strips is attached to resilient elastic material which stretches an amount sufficient to permit metal strips to be coupled together.

Other objects and many of the attendant advantages of the present invention will become readily apparent when recourse is had to the following detailed specification which is to be considered together with the accompanying drawings wherein:

FIG. 3 is a sectional view taken along line 3—3 of FIG. 1;

FIG. 4 is a fragmentary perspective view with certain portions broken away of the construction illustrated in FIG. 3;

FIG. 4A is a sectional view taken along line 4A—4A of FIG. 4;

FIG. 5 is a fragmentary rear elevation with certain portions broken away of a second form of the invention;

FIG. 6 is a view similar to FIG. 5 showing a third form of the invention; and

FIG. 7 is a sectional view comparable to FIG. 3 showing a locking device for the closure panel.

Figure 1:
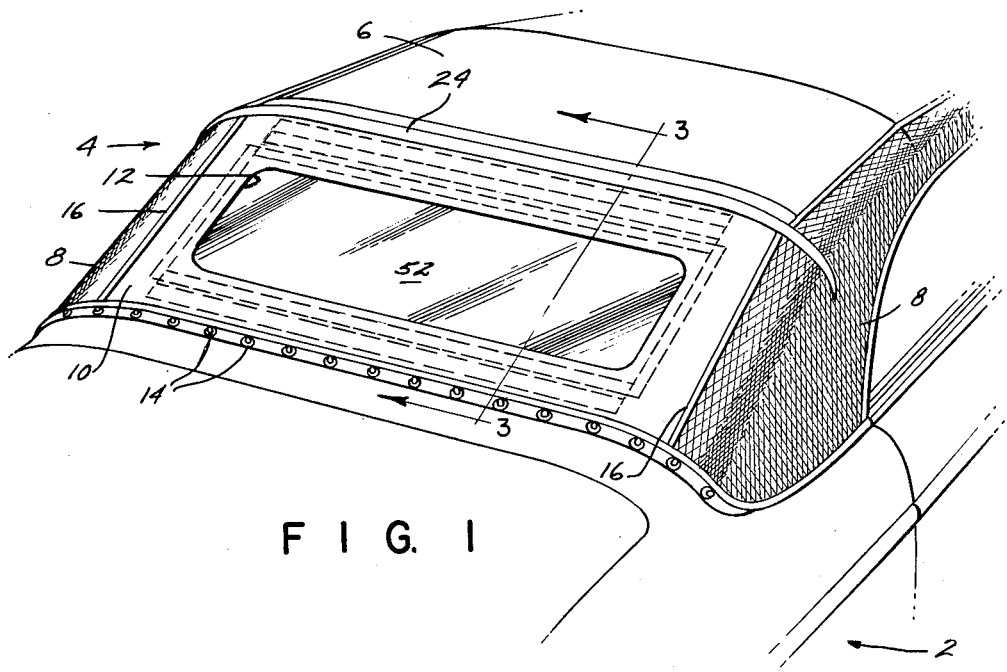
FIG. 1 is a fragmentary perspective view of a convertible automobile.
Figure 2:
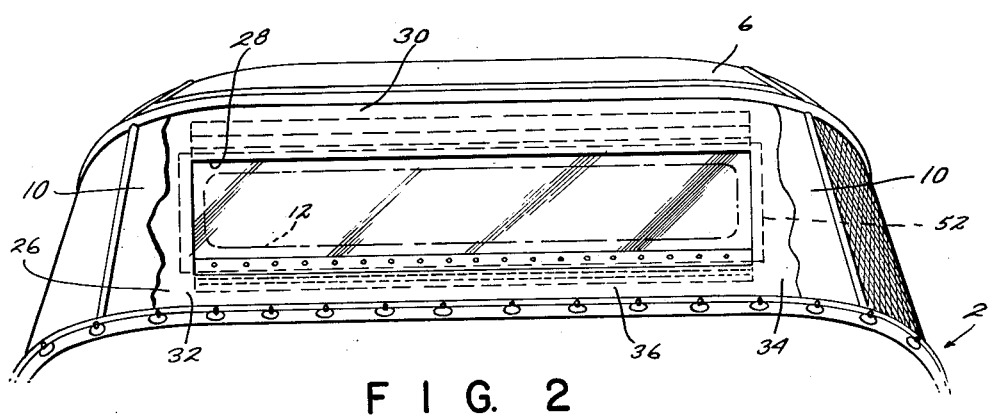
FIG. 2 is a fragmentary rear elevation of the same convertible automobile.

Referring now to FIGS. 1 and 2, there is shown a convertible automobile 2 having a collapsible top 4 which comprises a top section 6, opposite side sections 8, and a rear window section 10 having a rear opening 12. The rear ends of the side sections 8, like the rear section 10, are secured to the body of the automobile by suitable fasteners 14. These fasteners 14 may be of the rotatable awning type 14a shown in FIG. 3 or they may be of the snap type shown and described in U.S. Patent No. 2,765,192, which also relates to convertible automobile tops. The side sections 8 and the rear section 10 are stitched to each other at 16 and also to the top section 6. The rear section 10 and the top section 6 may be formed from a single piece of material, or rear section 10 may be made as a separate piece which is stitched to the top section. The fabric of top 4 is supported by suitable bow members 20 (FIG. 3) which give form to the top and support the fabric in stretched position. The form of bow construction as well as the form of lever construction associated therewith to accomplish raising and lowering of the top is not critical; any one of several forms of constructions currently in use may be employed with the present invention. The fabric of the top is generally tacked to the bows 20 with the assistance of suitable beads 24. The main purpose of a bead is to hide the tacking employed to secure the top to the bows and, depending upon the particular construction of top employed, the bead may also hide the stitching which connects one section to another, as, for example, the rear section to the top section.

To the extent already described, the illustrated construction is conventional. This conventional construction is modified in accordance with the present invention.

Referring now to FIGS. 2, 3, and 4, the present invention contemplates the provision of a rear window panel generally identified by numeral 26. This rear window panel has an opennig 28 and comprises a top quarter portion 30, opposite side quarter portions 32 and 34, and a bottom quarter portion 36. The top quarter portion 30 is anchored to the bow 20 by suitable tacking elements, as indicated at 38 in FIG. 3. The bottom quarter 36 is anchored to the body of the automobile by suitable fastening means, as, for example, the fasteners 14a used to secure the rear section 10 of the top. The side quarters are free but may be held in place against the rear section 10 of the top by suitable tension belts (not shown) which are commonly used in convertible tops. These belts, as shown in U.S. Patent No. 2,798,763, are connected to and extend between the different bows which make up the skeletal frame of the collapsible top. These belts extend along opposite sides of the top section of the top and pass down alongside the opening 12 formed in the rear section of the top so that they are not visible through this opening. The side quarters 32 and 34 of window panel 26 extend laterally a distance sufficient to be tucked under these belts.

Attached to the top quarter of the window panel 26 is a metal strip 40. This metal strip 40 has prongs 42 which are struck up out of the body of the strip by means of suitable dies. These prongs pierce the fabric of the window panel 26 and are bent down so as to clamp the fabric to the metal strip and vice versa. The bottom edge of the metal strip 40 is reversed to form a lip 44 and a channel 46. Channel 46 accommodates a lip 48 formed on a second metal strip 50. Lip 48 is formed in the same manner as lip 44. The second metal strip 50 is attached to a transparent pane 52 by prongs 54 that correspond in shape to prongs 42. The width of each of the strips 40 and 50, like the width of the transparent pane 52, is greater than the corresponding dimension of the window opening 12 in the rear section 10 of the top and the corresponding opening 28 of the window panel 26.

The bottom edge of the transparent plastic pane 52 is attached to a strip of resilient stretchable material 56 by means of suitable staple fasteners 58. Alternatively, the pane may be attached to the stretchable material 56 by other suitable means, as, for example, a cement. The bottom edge of the stretchable strip of material 56 may be attached to the body 2 of the automobile, but preferably, as in the illustrated embodiment, it is attached to the bottom quarter 36 of the window panel 26. It may be attached to the window panel by stitching 60. With respect to attachment of strip 56 directly to the body, this may be accomplished by the same rotatable fasteners 14a which are used to attach the rear section 10 of the top and the bottom quarter 36 of the window panel to the automobile body.

The purpose of the stretchable material 56 is to permit the metal strip 50 to be moved into locking engagement with the first metal strip 40. When the material 56 is unstretched, the lip 48 of the second metal strip 50 is just short of the metal strip 40. However, the material 56 will stretch enough to allow the lip 48 to clear the lip 44 and to be seated in the channel 46. When this is done, the transparent plastic pane 52 will be held parallel to and flat against the window panel 26. The glass pane 52 forms a closure for the opening 12 as well as for the opening 28 by the window panel 26. The closure is opened simply by stretching the material 56 enough to allow the lip 48 to be pulled clear of the lip 44. Once the closure has been detached, it will hang down like any other flap, leaving the openings 12 and 28 unobstructed.

FIG. 4A shows an optional feature. It consists of a narrow flap 62 stitched on the inner side of the window panel along the inner edges of side quarters 32 and 34. These flaps function as a wind seal for the side edges of the glass or plastic pane 52, the latter being tucked between the flap and the window panel as shown in FIG. 4A.

FIG. 5 shows a second form of the invention. In FIG. 5, the entire window panel 26a is like window panel 26 except that it is formed of stretchable material. Since the window panel 26a is made of stretchable material, the need for the separate piece 56 illustrated in FIG. 3 is eliminated. Similarly, it makes it possible to use a second pair of metal strips 40a and 50a connected to the window panel and to the plastic pane 50a respectively. With this construction, it is possible to completely detach the plastic pane from the window panel. The upper panel locking strip 50 is removed from its mating strip 40 by pulling the pane upward and the bottom strip 50a is removed from its mating strip 40a by moving the glass pane in the opposite direction. In this case, as in the embodiment of FIG. 3, the sides of the glass pane rest against but are not secured to the window panel. However, this construction still admits the use of side flaps like side flaps 62 shown in FIGS. 4 and 4A.

Of course, it is not necessary that the window panel be made of stretchable material. Instead, the same results may be accomplished by attaching the metal strip 40 of the embodiment of FIG. 3 to a strip of resilient material like strip 56 and then stitching this second strip to the quarter 30 of the window panel.

FIG. 6 shows a further extension of the present invention. In FIG. 6, each of the side quarters of the stretchable window panel 26a is provided with a pair of metal strips 66 and 68 which are comparable in construction and attachment to the aforesaid strips 40 and 40a. These metal strips are provided for attachment to corresponding metal strips 70 and 72 which are secured to the adjacent side edges of the transparent pane 52. The embodiment of FIG. 6 has an advantage over the embodiment of FIGS. 3 and 4 in that better sealing against the rain and snow is provided by virtue of the side seals in addition to the top and bottom seals. On the other hand, the disadvantage of the embodiment of FIG. 6 is that it is somewhat more expensive than the previously described embodiments. As with the embodiment of FIG. 5, the construction of FIG. 6 may be varied by making the window panel of non-stretchable fabric and using strips of stretchable material like strip 56 to connect the metal strips 66 and 68 to the window panel.

FIG. 7 shows a feature which is made possible by virtue of the fact that metal strips are used to attach the closure panel to the window panel. This feature consists of a hole 80 in the lip 44 of the metal strip 40 and a tapped bushing 82 which is welded to the metal strip 50 and which accommodates a thumb screw 84. The metal strip 50 also is provided with a hole 86 which is in axial alignment with the hole in the bushing 82. Hole 86 and bushing 82 are located so that when the two metal strips are coupled together as illustrated in FIG. 7, the thumb screw 84 may be turned into the hole 80 formed in lip 44 of the metal strip 40. When this is done, it is impossible to detach one metal strip from the other without first releasing the thumb screw 84. This feature prevents the metal strips from moving both transversely and longitudinally relative to each other.

It is to be observed that the metal strips 40 and 50, 40a and 50a, etc., are so formed that the lip of one will readily fit into the channel of the other. However, it is also contemplated that the lip of one may be formed in such a fashion as to provide a wedge-shaped channel, in which case the lip of the other strip can be forced into the channel so as to make a frictional grip thereto. This will help prevent sidewise relative motion of the two metal strips. This feature is not necessary but is mentioned solely as a possible variation of the invention.

It is believed to be apparent from the foregoing detailed description that the present invention provides many advantages over the standard or conventional constructions currently in vogue. The metal strips are substantially less expensive than the zippers which are now being used. Similarly, these metal strips may be attached without difficulty to the window panel directly or to separate resilient strips which in turn are attached to the window panel. Contrast this with the problem of stitching a zipper onto a window panel. Alignment of a zipper is a critical problem, and if the zipper is not properly positioned, it will be difficult, and in some cases even impossible, to close the zipper all the way. A further advantage is provided by using the elasticized material. In the event of shrinkage of the top, the elasticized material will still permit the closure member to be locked in place. Another material advantage of the present invention is that it makes it possible to provide closure members which are attached permanently at one end so as to function as a flap (see the embodiment of FIG. 3) or which may be completely detached from the top (see FIGS. 5 and 6). Still another advantage of the present invention is that closing of the closure member can be effected in much less time than in the case of a zipper-type construction.

It is to be understood that the stretchable material may vary in structure and composition. Preferably, it is an elasticized fabric such as is used to make girdles for women. However, it may simply be a sheet of a suitable natural or synthetic elastomer or a fabric wherein the weft and/or warp comprises a textile filament preset by a plastic coating into a stretchable configuration.

Obviously, many modifications and variations of the present invention will suggest themselves to persons skilled in the art. Thus, for example, it may be considered feasible to a person skilled in the art to completely eliminate the window panel 26 and instead to secure the metal strips 40 and 40a to narrow strips of material which can be stitched directly to the rear section 10 of the top. Similarly, the metal strips 50, 50a, 70 and 72 need not be secured to strips of stretchable material such as an elasticized fabric, and these strips of stretchable material may in turn be secured directly to the transparent pane. Other comparable variations and modifications will suggest themselves to persons skilled in the art. Accordingly, it is to be understood that this invention is not be restricted except within the spirit and scope of the following claims.

I claim:

1. In combination with a foldable top secured to a vehicle body along its lower edge and having a rear section with a first window opening therein, a window panel disposed inwardly of said rear section, said window panel having a second opening in registration with said first opening, a window closure panel stretchable along one edge thereof, and means for releasably securing said window closure panel to said window panel in closing relation to said openings, said means comprising a first metal strip secured to said closure panel along one edge thereof and a second metal strip attached to said window panel, said first and second metal strips adapted to be releasably coupled together under tension along adjacent edges.

2. In combination with a foldable top secured to a vehicle body along its lower edge and having a rear section with a first window opening therein, a window panel disposed inwardly of said rear section, said window panel having a second opening in registration with said first opening, a window closure panel, and means for releasably securing said window closure panel to said window panel in closing relation to said openings, said means comprising a first metal strip secured to said closure panel along one edge thereof and a second metal strip attached to said window panel by a piece of stretchable material, said first and second metal strips adapted to be releasably coupled together under tension along adjacent edges.

3. In combination with a foldable top secured to a vehicle body along its lower edge and having a rear section with a first window opening therein, a window panel disposed inwardly of said rear section, said window panel having a second opening in registration with said first opening, a window closure panel stretchable along its bottom edge, and means for releasably securing said window closure panel to said window panel in closing relation to said openings, said means comprising a first metal strip secured to said closure panel along one edge thereof and a second metal strip attached to said window panel, said first and second metal strips adapted to be releasably coupled together under tension along adjacent edges.

4. In combination with a foldable top secured to a vehicle body along its lower edge and having a rear section with a first window opening therein, a window panel disposed inwardly of said rear section, said window panel having a second opening in registration with said first opening, a window closure panel which embodies a pane of transparent material, and means for releasably securing said window closure panel to said window panel in closing relation to said openings, said means comprising a first metal strip secured to said closure panel along one edge thereof and a second metal strip attached to said window panel, said first and second metal strips adapted to be releasably coupled together under tension along adjacent edges.

5. In combination with a foldable top secured to a vehicle body along its lower edge and having a rear section with a first window opening therein, a window panel disposed inwardly of said rear section, said window panel having a second opening in registration with said first opening, a window closure panel, and means for releasably securing said window closure panel to said window panel in closing relation to said openings, said means comprising a first metal strip secured to said closure panel along one edge thereof, a second metal strip attached to said window panel, said first and second metal strips adapted to be releasably coupled together under tension along adjacent edges, and means separable from said adjacent edges for releasably locking together said first and second metal strips.

6. In combination with a foldable top secured to a vehicle body along its lower edge and having a rear section with a first window opening therein, a window panel disposed inwardly of said rear section, said window panel having a second opening in registration with said first opening, a window closure panel, and means for releasably securing said window closure panel to said window panel in closing relation to said openings, said means comprising a first metal strip secured to said closure panel along one edge thereof and a second metal strip attached to said window panel, said first and second metal strips adapted to be releasably coupled together under tension along adjacent edges, said adjacent edges being bent to form channels with the adjacent edge of one metal strip releasably disposed in the channel formed by the adjacent edge of the other metal strip.

References Cited in the file of this patent

UNITED STATES PATENTS

| 326,036 | Hoops | Sept. 8, 1885 |
| 2,954,999 | Fingerman | Oct. 4, 1960 |

FOREIGN PATENTS

| 503,371 | Great Britain | Apr. 5, 1939 |
| 589,872 | France | June 6, 1925 |